(12) United States Patent
Fernandez Aymerich et al.

(10) Patent No.: US 11,383,448 B2
(45) Date of Patent: Jul. 12, 2022

(54) GENERATING OBJECTS IN ADDITIVE MANUFACTURING UTILIZING A PREDEFINED PORTION WITHIN A THRESHOLD DISTANCE OF A WALL OF FABRICATION CHAMBER

(71) Applicant: HEWLETT-PACKARD DEVELOPMENT COMPANY, L.P., Spring, TX (US)

(72) Inventors: Ismael Fernandez Aymerich, Sant cugat del Valles (ES); Sergio Puigardeu Aramendia, Sant cugat del Valles (ES); Pol Fornos Martinez, Sant cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,359

(22) PCT Filed: Mar. 28, 2018

(86) PCT No.: PCT/US2018/024915
§ 371 (c)(1),
(2) Date: Oct. 15, 2019

(87) PCT Pub. No.: WO2019/190506
PCT Pub. Date: Oct. 3, 2019

(65) Prior Publication Data
US 2021/0283849 A1   Sep. 16, 2021

(51) Int. Cl.
*B33Y 50/02* (2015.01)
*B29C 64/393* (2017.01)
*B33Y 10/00* (2015.01)

(52) U.S. Cl.
CPC ............ *B29C 64/393* (2017.08); *B33Y 10/00* (2014.12); *B33Y 50/02* (2014.12)

(58) Field of Classification Search
CPC .......................................... G05B 2219/32035
(Continued)

(56) References Cited

U.S. PATENT DOCUMENTS

| 2001/0015238 A1 | 8/2001 | Gaylo et al. |
| 2006/0074394 A1 | 4/2006 | Beretta et al. |

(Continued)

FOREIGN PATENT DOCUMENTS

| CN | 104552962 A | 4/2015 |
| CN | 106142555 A | 11/2016 |

(Continued)

OTHER PUBLICATIONS

3D Printing: Heat Shields for Larger Parts.

*Primary Examiner* — Suresh Suryawanshi
(74) *Attorney, Agent, or Firm* — HP Inc. Patent Department

(57) ABSTRACT

A method is disclosed. The method may comprise obtaining, using a processor, design data representing an object to be generated in a fabrication chamber of an additive manufacturing apparatus. The method may further comprise determining, based on the design data, that a part of the object is to be generated within a predefined portion of the fabrication chamber. The method may further comprise responsive to said determining, generating, using a processor, data representing an ancillary element to be generated in the predefined portion between the part of the object and a wall of the fabrication chamber. An apparatus and a machine-readable medium are also disclosed.

15 Claims, 5 Drawing Sheets

(58) Field of Classification Search
USPC .......................................................... 700/98
See application file for complete search history.

(56) References Cited

U.S. PATENT DOCUMENTS

| | | |
|---|---|---|
| 2008/0006334 A1 | 1/2008 | Davidson et al. |
| 2011/0083768 A1 | 4/2011 | Sims et al. |
| 2012/0107438 A1 | 5/2012 | Bokodi et al. |
| 2015/0306666 A1* | 10/2015 | Honda .................. B29C 64/255 425/78 |
| 2016/0288413 A1 | 10/2016 | Yakubov et al. |
| 2016/0339431 A1* | 11/2016 | Shmilovich ....... B01L 3/502707 |
| 2017/0066195 A1 | 3/2017 | Chu et al. |
| 2017/0072646 A1* | 3/2017 | Sakura ................... B33Y 10/00 |
| 2017/0129184 A1 | 5/2017 | Buller et al. |
| 2018/0169953 A1* | 6/2018 | Matusik ................ B29C 64/393 |
| 2020/0324489 A1* | 10/2020 | Fornos ................... B33Y 40/00 |

FOREIGN PATENT DOCUMENTS

| | | |
|---|---|---|
| JP | 2013176893 A | 9/2013 |
| WO | WO2016010590 A1 | 1/2016 |

* cited by examiner

GENERATING OBJECTS IN ADDITIVE MANUFACTURING UTILIZING A PREDEFINED PORTION WITHIN A THRESHOLD DISTANCE OF A WALL OF FABRICATION CHAMBER

BACKGROUND

Additive manufacturing systems are able to generate three-dimensional objects on a layer-by-layer basis through the solidification of a build material in examples of such techniques, build material is supplied in a layer-wise manner and a solidification method may include heating the layers of build material to cause melting in selected regions. In other techniques, other solidification methods, such as chemical solidification methods or binding materials, may be used.

BRIEF DESCRIPTION OF DRAWINGS

Examples will now be described, by sway of non-limiting example, with reference to the accompanying drawings, in which.

DETAILED DESCRIPTION

Figure 1:
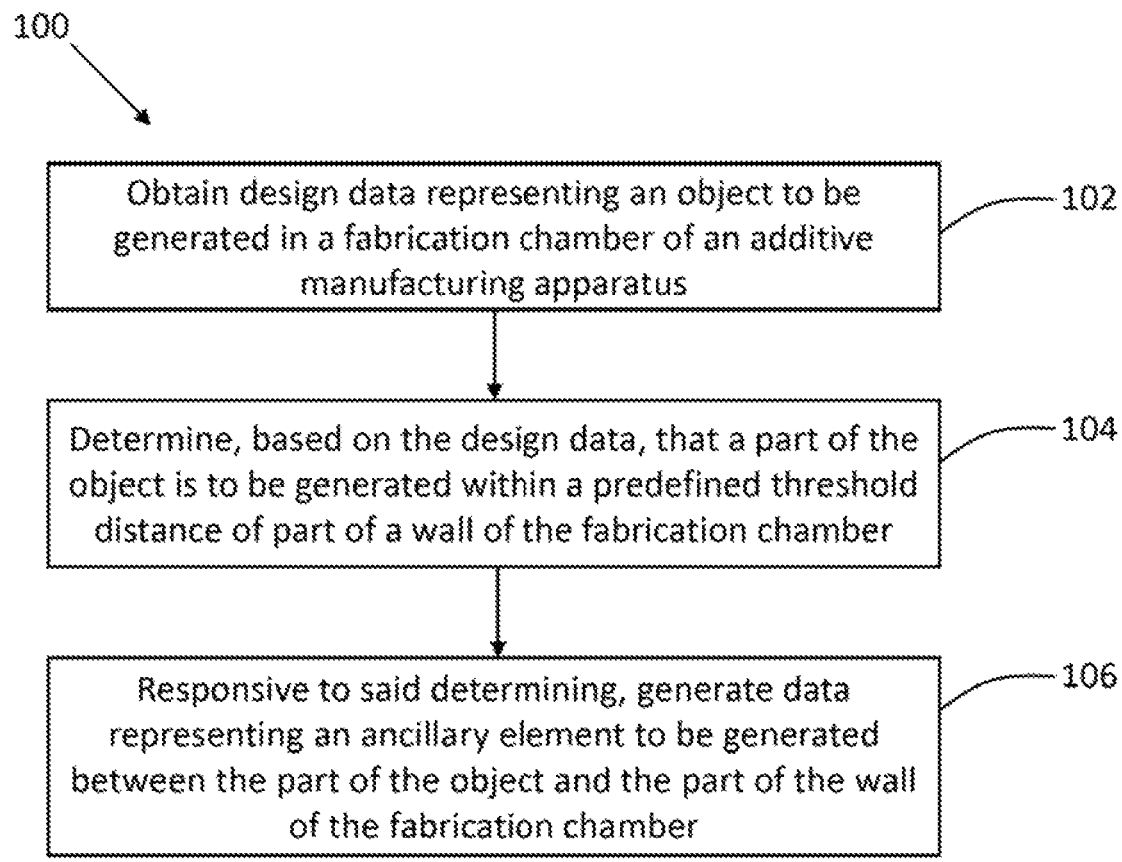
FIG. 1 is a flowchart of an example of a method of designing a three-dimensional object.

Additive manufacturing techniques may generate a three-dimensional object through the solidification of a build material. In same examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern.

According to one example, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such a fusing agent may additionally comprise a near infra-red light absorber. In one example such a fusing agent may additionally comprise a visible light absorber. In one, example such a fusing agent may additionally comprise a UV light absorber. Examples of print agents comprising visible light enhancers are dye based colored ink and pigment based colored ink, such as inks commercially known as CE039A and CE042A available from HP Inc.

In other examples, coalescence may be achieved in some other manner.

In addition to a fusing agent, in some examples, a print agent may comprise a coalescence modifying agent (referred to as modifying or detailing agents herein after), which acts to modify the effects of a fusing agent for example by reducing or increasing coalescence or to assist in producing a particular finish or appearance to an object, and such agents may therefore be termed detailing agents. A detailing agent (also termed a "coalescence modifier agent" or "coalescing modifier agent") may, in some examples, have a cooling effect. In some examples, the detailing agent may be used near edge surfaces of an object being printed. According to one example, a suitable detailing agent may be a formulation commercially known as V1Q61A "HP detailing agent" available from HP Inc. A coloring agent, for example comprising a dye or colorant, may in some examples be used as a fusing agent or a modifying agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

An example additive manufacturing apparatus may include a print bed, or build platform, onto which a layer of build material may be formed. The additive manufacturing apparatus may also include a build material distributor to distribute or form build material on the print bed. In some examples, the additive manufacturing apparatus may include at least one source of radiation to direct radiation towards the print bed. The source of radiation may comprise at least one heat lamp, such as an infrared lamp, which may be positioned above the print bed such that radiation is directed downwards towards the print bed. The source of radiation may, in some examples, include at least one pre-heating lamp for pre-heating the build material and/or at least one fusing lamp for applying heat to fuse portions of the build material. The additive manufacturing apparatus may also include an agent distributor to distribute agent, such as fusing agent and/or detailing agent, onto the layer of build material formed on the print bed. The agent distributor may include at least one set of nozzles through which the print agent may be distributed onto the build material, each set of nozzles having at least one individual nozzle. The nozzles and/or the sets of nozzles may form part of a print head which, in some examples, may be a thermal print head or a piezo print head. The agent distributor may be movable relative to the print bed such that print agent may be selectively deposited, for example drop-by-drop, onto a portion of the layer of build material in a pattern derived from data representing a slice of the three-dimensional object to be built.

In some examples, it may be intended that an object, or multiple objects, are to be generated (e.g. built on a layer-by-layer basis) on a print bed within a fabrication chamber of an additive manufacturing apparatus. Near to the centre of the chamber and print bed, the temperature of build material may remain relatively constant, and may not reduce rapidly, because the build material is insulated by surrounding build material. However, nearer to the edges of the chamber, heat from the build material may, be lost more rapidly through walls of the fabrication chamber, as there is less surrounding build material to provide a thermally insulating effect. Thus, the temperature of build material positioned near to the walls of the chamber may reduce relatively rapidly compared to the build material nearer the centre of the chamber. Rapid changes in temperature of build material may result in defects (e.g. aesthetic or structural defects) being formed in objects being generated.

Examples disclosed herein provide a mechanism by which a target object may be generated near to a wall of a fabrication chamber without the temperature of the target object being caused to reduce rapidly as a result of thermal, losses through the chamber walls. Specifically, examples disclosed herein provide a mechanism by which an additional object may be designed (e.g. automatically) and generated at the same time that the target object is generated, the additional object to be generated between the target object and the wall of the chamber through which the greatest amount of thermal loss will occur from the target object. In this way, the additional object may act as a thermal shield to reduce the heat transferred from the target object through the chamber wall; the generation of the additional object involved thermal fusion which, itself will heat the build material between the target object and the chamber wall.

FIG. 1 is a simplified flowchart of an example of a method 100 according to examples disclosed herein. The method 100 may be considered to be a method of designing a three-dimensional object. The method 100 comprises, at block 102, obtaining, using a processor, design data representing an object to be generated in a fabrication chamber of an additive manufacturing apparatus.

The design data may be object model data representing at least a portion of the object to be generated by fusing portions layers of build material. The design data may, for example, comprise a Computer Aided Design (CAD) model, and/or may be a STereoLithographic (STL) data file. In some examples, the data may be in the following formats: Extensible Markup Language (XML), Virtual Reality Modeling Language (VRML), object (OBJ), Additive Manufacturing File Format (AMF), and 3D Manufacturing Format (3MF). In other examples, the data may be in another format.

The processor may obtain or acquire the design data from a storage unit (e.g. a memory), or may receive the design data as an input, for example from a file uploaded or otherwise provided by a user.

The design data may, for example, include information describing a size and/or shape of at least a portion of an object to be generated, and a position within the fabrication chamber and/or on the print bed at which the object is to be generated. The design data may also include information describing an amount of build material to be used, an amount of print agent to be used, information indicative of a colour of build material and/or of print agent to be used, and so on, in some examples, the design data may include information describing the structure of the object to be generated, but may not include information describing the spatial location at which the object is to be generated within the fabrication chamber. The location at which the object is to be generated, and the spatial arrangement of objects when multiple objects are to be generated, may be determined separately. For example, a packing algorithm may be used to determine an arrangement of objects within a build volume. In other examples, a user may manually select the position or positions at which an object or objects are to be generated within the fabrication chamber (e.g. using a computer executable design program). Thus, while the design data may, in some examples, include spatial location data describing the location within the fabrication chamber at which the object is to be generated, in other examples, the spatial location data may be obtained separately and/or combined with the design data.

At block 104, the method 100 comprises determining, based on the design data, that a part of the object is to be generated within a predefined portion of the fabrication chamber. As is clear from the discussion below, the predefined portion may comprise a portion of the fabrication chamber which is within a defined distance of the surrounding wall of the chamber. Dimensions of the fabrication chamber and/or of the print bed may vary from print apparatus to print apparatus. The dimensions of each chamber and print bed are available to the processor associated with the print apparatus. For example, the dimensions may be stored in a memory associated, with and accessible to the processor. Therefore, the processor is able to compare the intended arrangement of objects (from the design data) with the dimensions of the fabrication chamber, and determine where in the chamber each object is intended to be generated. It can therefore be determined whether any object is intended to be generated within a particular (i.e. predefined) volume, region or portion of the fabrication chamber, for example close to (i.e. within a threshold distance of) a wall of the chamber. The threshold distance may vary from chamber to chamber since the heat dissipation through a wall of a chamber may vary from print apparatus to print apparatus. Similarly, the defined threshold distance for one part of a chamber wall may differ from the threshold distance for another part of the chamber wall due to structural differences in walls of a chamber. Therefore, each part of a fabrication chamber wall may have its own associated threshold distance. Accordingly, the predefined portion the fabrication chamber may vary from chamber to chamber. The predefined region, portion or volume may, for example, comprise a region having a defined thickness (or a varying thickness) extending into the chamber from an inside surface of the walls of the chamber. Thus, if a part of an object is generated outside of the predefined portion of the chamber (e.g. at a distance from the chamber wall greater than the predefined threshold distance), then that part of the object is unlikely to suffer from issues relating to rapid heat loss through the wall of the chamber. However, a part of an object generated within the predefined portion of the chamber (e.g. less than the predefined threshold distance from the chamber wall) may lose heat through the chamber wall and, therefore, may suffer from the associated issues discussed above.

In examples where the spatial location data is obtained separately from the design data, the determining of block 104 may be performed based on the design data and the spatial location data.

The method 100 comprises, at block 106, responsive to said determining (at block 104), generating, using a processor, data representing an ancillary element to be generated in the predefined portion between the part of the object and a wall of the fabrication chamber. Thus, block 106 of the method 100 involves the processor designing a supplementary object which will compensate for the expected heat loss in the target object be generated through the part of the chamber wall closest to the object. In this way, the ancillary element may act as a thermal shield to reduce the amount of heat able to escape from the target object through the chamber wall. Furthermore, the generation of the ancillary element will cause an increase in temperature of the build material between the target object and the chamber wall, thereby causing the temperature of the build material used to generate the target object to be more uniform across the object. The ancillary element designed at block 106 is to be generated in the predefined portion of the fabrication chamber into which the object is determined (in block 104) to extend. In this way, the generation of the ancillary element causes an increase in temperature (e.g. of the build material) within the predefined portion of the fabrication chamber, thereby reducing the thermal gradient in build material at the location at which the object is to be generated.

In some examples, the method 100 may determine, at block 104, that a part of the object is to be generated within a predefined threshold distance of a part of a wall of the fabrication chamber. At block 106, responsive to the determining of 104, the method may comprise generating data representing an ancillary element to be generated between the part of the object and the part of the wall of the fabrication chamber. Thus, the ancillary element is to be generated at a position in the fabrication chamber directly between the object and the portion of the wall through which heat from the object is expected to be lost.

The ancillary element may, in some examples, be referred to as an ancillary or auxiliary object, a dummy element or a dummy object, as the purpose of the ancillary element is just to improve the quality of the corresponding object to be generated. It is not generally intended that the ancillary element, once generated, is to serve any further purpose.

The shape and size of the ancillary element or object to be generated may vary from case to case, for example based on the size, shape and position of the target object to be generated. In some examples discussed below, the ancillary element may be designed to have a size and shape which provides suitable compensation for the heat loss from the target object, while minimising the amount of build material and/or print agent to be used in its generation. In some examples, the ancillary element may be designed to form a wall around the entire print bed. While such an ancillary element might increase the area of the print bed to be used for generating objects without build defects, a significant amount of print agent and other materials might be used in generating such an ancillary element.

By generating data representing an ancillary element to be generated along with the objects (i.e. the target objects) the method enables a greater area of the print bed to be utilised (and, therefore, a greater volume of the fabrication chamber), as parts of the print bed and the chamber which are not generally intended to be used can be used to generate objects having an intended quality. Consequently, productivity of a user of the fabrication chamber and the associated additive manufacturing apparatus may be increased. In examples where design data indicates that an object is inadvertently to be generated within the predefined portion of the fabrication chamber (e.g. close to a wall of the chamber), then the disclosed method enables the object to be generated at that location without suffering any adverse effects in terms of reduced build quality. Furthermore, the method allows a user to intentionally plan for objects to be generated within the predefined portion of the fabrication chamber, such that a greater volume of the fabrication chamber may be, used, thereby increasing productivity.

In some examples, as noted above, a processor may select the locations within the fabrication chamber at which objects are to be generated, for example using a packing algorithm. In order to increase the productivity of the fabrication chamber, target objects may be intentionally generated in the predefined portion of the fabrication chamber (e.g. close to the wall of the chamber) since ancillary elements can be generated between the target objects and the chamber walls to reduce the effects of heat loss from the target objects through the walls. Thus, the processor may deliberately position a target object within a 'boundary region' of the chamber (e.g. within the predefined portion) as it knows that an ancillary element can be generated appropriately such that the target object is to be generated correctly. Thus, the method may comprise running a packing algorithm to spatially arrange a set of objects to be generated within the fabrication chamber. In some examples, determining (at block 104) that a part of the object is to be generated within the predefined portion may comprise arranging for at least part of the object to be generated within the predefined portion of the fabrication chamber.

Figure 2A:
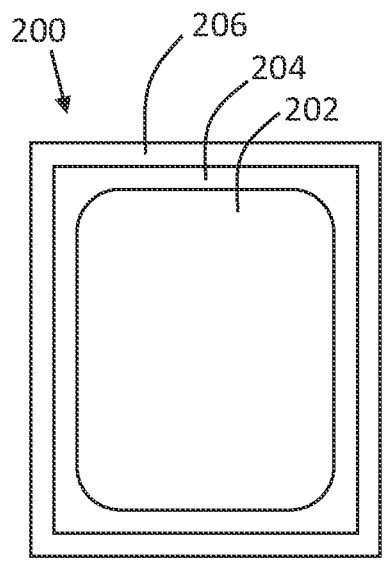
FIGS. 2A-2D are is a series of schematic illustrations showing an example implementation of a method of designing a three-dimensional object.
Figure 2B:
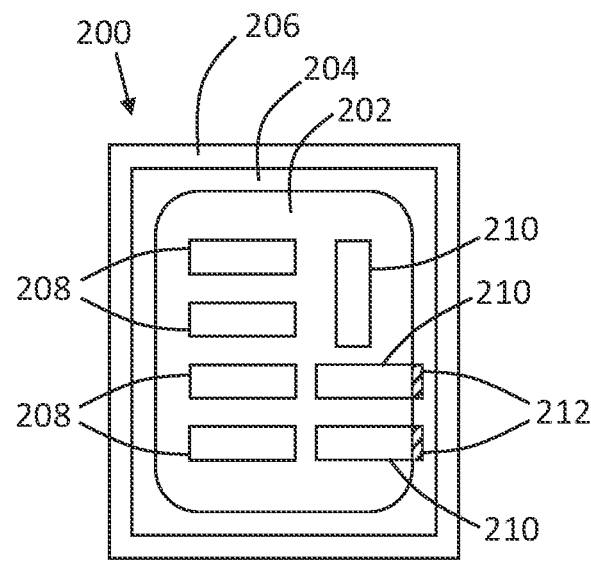

An example implementation of the method 100 is shown in FIG. 2 FIG. 2A is a plan view of an example print bed 200 within a fabrication chamber. The print bed may, in some examples, be around 14" (35.6 cm)×18" (45.7 cm). Walls of the fabrication chamber are formed around the perimeter of the print bed. The print bed 200 may include a first region 202 in which objects may be generated sufficiently far away from the walls of the fabrication chamber that heat loss issues are not applicable, may be negligible, or may be small enough that they do not adversely affect the quality of the object to be generated. The first region 202 may, therefore, be referred to as a "high quality" build region. The first region is smaller than the print bed, and its dimensions may vary from chamber to chamber. The print bed 200 may also include a second region 204 in which objects may be generated. However, the second region 204 is relatively close to the walls the fabrication chamber and, therefore, an object generated within this region may suffer from build defects as a result of heat losses from the object through the fabrication walls. The second region 244 may, therefore, be referred to as a "low quality" build region. Objects may be generated in the second region 204 if the quality of the object to be built is not a high priority to a user. The area of the first region and the second region may, in some examples, be around 12" (30.5 cm)×16' (40.6 cm). The print bed 300 may also include a third region 206 in which objects are not to be generated. The third region 206 is adjacent to the walls of the fabrication chamber and, therefore, objects generated in this region would lose heat through the walls. The third region 206 may, therefore, be referred to as a "non-printable" region. Given the example dimensions of the first and second regions above, the third region may form a border having a thickness of around 2" (5.1 cm) around the edge of the print bed. Thus, in this example, the predefined threshold distance of the wall of the chamber may be around 3" (7.6 cm) and 4" (101 cm) (i.e. the minimum distance from the chamber wall to the perimeter of first region 202). In some examples, the object may be considered to be within the predefined threshold distance of the wall if the object extends into the second and/or third regions 204, 206. It will be appreciated that the first, second and third region 202, 204, 206 extend upwards (i.e. in three dimension) from the print bed, for example to a top wall of the fabrication chamber), FIG. 2B is a plan view of the print bed 200 and includes locations of various, objects 208 and 210 to be generated using an additive manufacturing process in the fabrication chamber. In this example, the objects to be generated are cuboid shaped objects. However, it will be appreciated that additive manufacturing may be used to create three-dimensional objects of almost any shape. The arrangement of the objects to be generated may be included in the design data (e.g. the design data obtained at block 102). In this example, the objects 208 are to be generated within the first region 202 (i.e. in the high quality build region) of the print bed 200. However, the objects 210 are to be generated with a portion 212 of each object extending out of the first region 202 and into the second region 204 (i.e. the low quality build region). For various reasons, it may not be possible to modify the design data or the object location data such that the objects 210 are to be generated wholly within the first region 202. For example, it may be intended that this the objects 210 are to be generated with a minimum separation between them.

In some examples, the print bed 200 and/or the fabrication chamber may be considered to include two regions: an inner region and an outer region. The inner region may be considered to be a "high quality" build region, where objects may be generated with no adverse effects resulting from heat loss through the chamber was. The inner region may be similar to the first region 202. The outer region may be referred to as a "safety zone" or "safety region", where objects may be generated when an ancillary object is also generated in order to reduce any adverse effects resulting from heat less through the chamber walls. The outer region may be equivalent to a combination of the second and third regions 204, 206.

In order to limit the amount of heat able to dissipate from the objects 210 through a wall of the fabrication chamber, a processor is used to determine that part of the objects 210 are to be generated within the second region 204 (i.e. within a predefined threshold distance of part of a wall of the fabrication chamber), and design an ancillary element for each object, to be generated between the portion 212 of each object extending into the second region 204 and the corresponding part of the wall of the fabrication chamber (i.e. the portion of the wall closest to each object, as these are the portions of the wall through which heat from the objects would be lost).

Figure 2C:
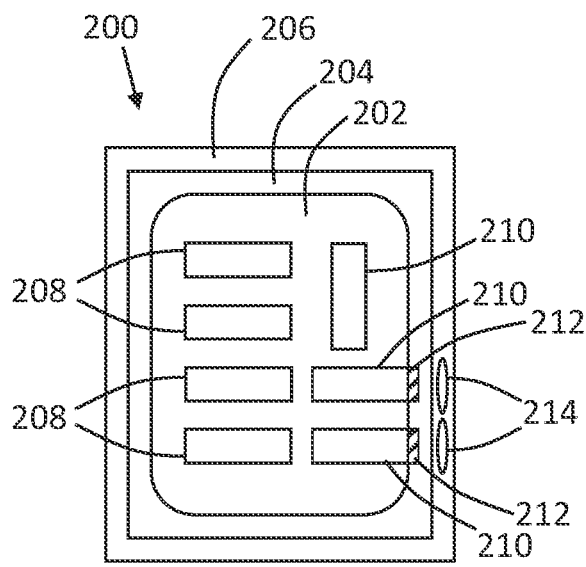

FIG. 2C is a plan view of the print bed 200 showing the locations of the objects 208, 210 and locations of ancillary elements 214 (e.g, additional, or supplementary objects) to be generated between the objects 210 and the wall of the fabrication chamber. In this example, the ancillary elements 214 are rounded in shape. For example, the ancillary elements 214 may be oval disc shaped. In some examples, the ancillary elements 214 may be lens-shaped (e.g. convex lens-shaped). However, as is apparent from the discussion below, the ancillary elements 214 may take any form, and the exact shape and/or size of each ancillary element 214 may be based on the nature (e.g. the size, shape and/or position) of the object 208, 210 with which it is associated (i.e. the object having a part within a predefined region, or within a predefined threshold distance of the wall).

Figure 2D:
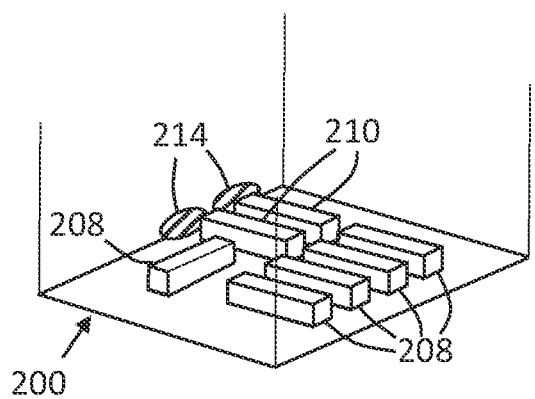

FIG. 2D is a (not-to-scale) perspective view of a fabrication chamber having the print bed 200 located therein, with the positions of the objects 208, 210 indicated as three dimensional representations. The ancillary elements 214 are shown between the objects 210 and the wall of the chamber which is nearest to the objects. It should be noted that while, in this example, the objects 208, 210 are shown to be generated on the print bed 200, objects may be generated at a location away from the print bed, for example higher up in the fabrication chamber.

Figure 3:
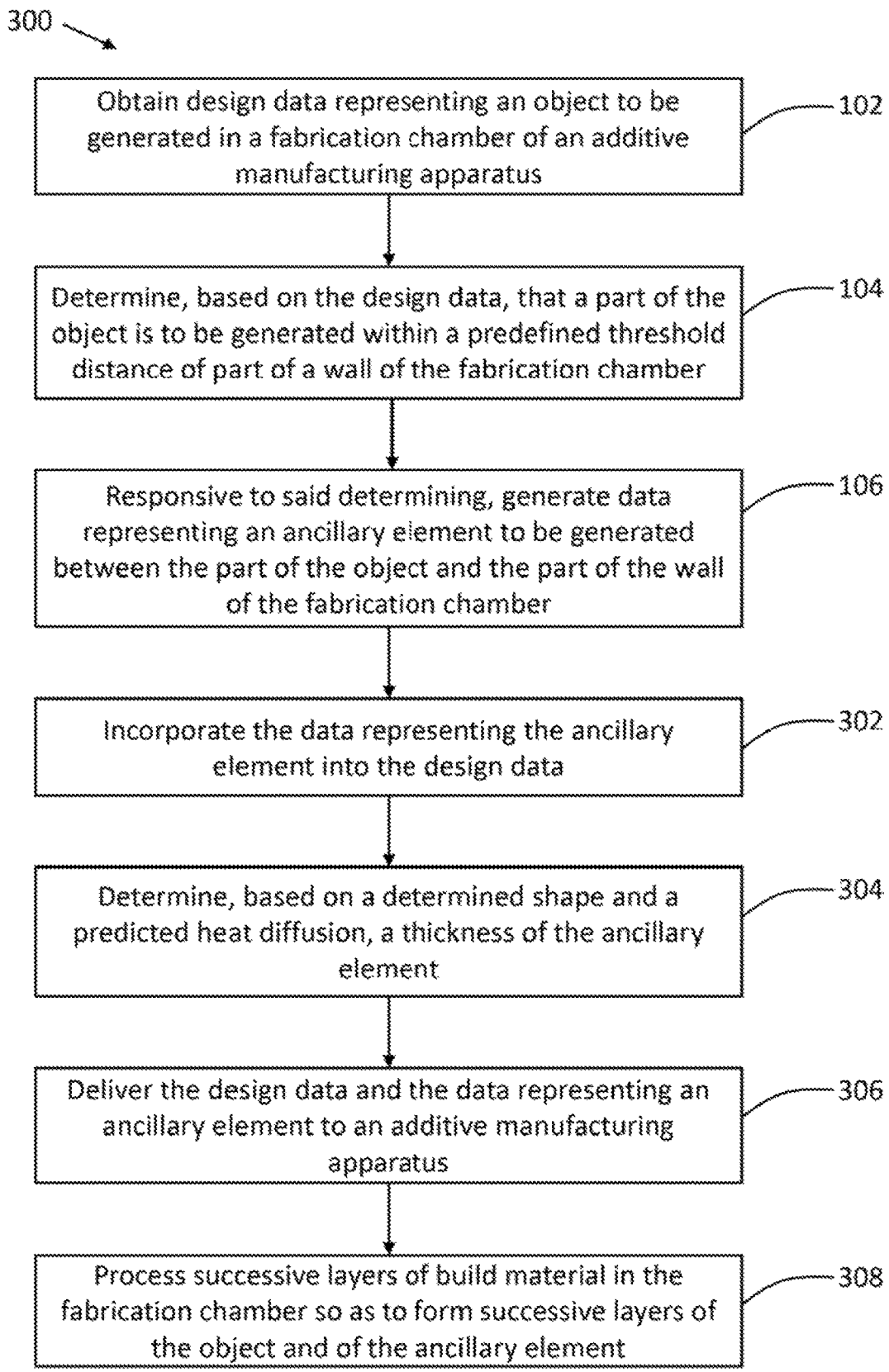
FIG. 3 is a flowchart of a further example of a method of designing a three-dimension object.

FIG. 3 is a flowchart of a further example of a method 300 (e.g. a method of designing a three-dimensional object). The method 300 may include blocks of the method 100 discussed above. The method 300 may comprise, at block 302, incorporating the data representing the ancillary element into the design data. Thus, once the data representing the ancillary element has been determined (e.g. once the processor has designed the ancillary element), the data may be added to or combined with the design data so that the design data includes details of the objects intended to be generated and details of the ancillary elements which will cause the objects to be generated with a consistent quality. In this way, the design data may be considered to be updated or revised to include data representing associated ancillary elements.

As noted above, the ancillary element may be designed to have any form (e.g. size, shape and/or location). In some examples, however, the structure of the ancillary element may be determined based on the object to be generated. More particularly, the structure of the ancillary element may, in some examples, be determined based on the nature of the part of the object that is to be generated within the predefined threshold distance of the wall. For example, the data representing the ancillary element may be determined and/or generated based on the size and/or shape of the part of the object and/or the extent to which it extends into the second region 204 of the print bed.

According to some examples, generating data representing the ancillary element (e.g. at block 106) may comprise predicting, based on the design data, heat diffusion from the object. To do this, a processor may be used to generate a projection of the object having the part within the predefined threshold distance, of the wall (e.g. the portion 212), for example using an algorithm. Such an algorithm may, for example, be, implemented as executable code. Based on the structure of the object (e.g. based on the projection of the object), a heat diffusion pattern may be estimated or predicted, for example using an algorithm. Such a heat diffusion algorithm may provide a prediction of how heat from the object will disperse from the object towards the wall of the chamber. The heat diffusion pattern or profile may be based on the nature of other objects to be generated in the chamber, and on the nature and amount of build material between the object and the wall. Thus, the data upon which the heat diffusion pattern prediction may be based may be obtained from the design data obtained at block 102. Once the heat diffusion for the object has been estimated, the processor may determine the shape of the ancillary element to be generated, which will compensate for, or reduce, the heat losses from the object through the chamber wall. The processor may also determine the volume of the ancillary element 214 to be generated, using the estimated heat diffusion. For example, a large object which is particularly close to the chamber wall may lose a large amount of heat through the wall. Therefore, data may be generated for an ancillary element which has a relatively large volume, so that sufficient heat can be produced by generating the ancillary element to reduce the heat losses from the object. Thus, generating data representing the ancillary element (e.g. at block 106) may further comprise determining a shape of the ancillary element 214 based on the predicted heat diffusion.

In some examples, the shape and size (e.g. the volume and/or the thickness) of the ancillary element may be determined at the same time, once the heat diffusion from the object has been estimated. In other examples, an ancillary element thickness calculation may be performed based separately, once the shape of the ancillary element has been determined. Thus, the method 300 may comprise, at block 304, determining, based on the determined shape and the predicted heat diffusion, a thickness of the ancillary element 214.

The process of generating data representing an ancillary element may be repeated for each object part within the predefined region of the chamber (e.g. within a predefined distance of a part of the wall of the chamber). For example, according to a planned build (e.g. from the design data and/or build location data) multiple objects may each have a part in the predefined region, or a single object may have multiple parts in the predefined region.

At block 306, the method 300 may comprise, delivering the design data and the data representing an ancillary element to an additive manufacturing apparatus. In some examples, as noted above, the data representing an ancillary element may be incorporated into the design data to form modified design data. In such examples, the modified design data may be delivered to an additive manufacturing apparatus. In some examples, the processor performing the processes of the blocks of the method disclosed herein may be implemented in an additive manufacturing apparatus. For example, design data may be provided to the additive manufacturing apparatus, and a processor in the apparatus may perform the blocks of the methods 100, 300. In other examples, the processing (i.e. the blocks of the methods 100, 300) may be performed as a pre-processing process, for example using a processing resource of a computing device. Once the ancillary element data has been generated, the design data and the ancillary element data may be delivered (e.g. sent or transmitted) either separately or as a combined file or data set to an additive manufacture apparatus to be processed (i.e. for the object(s) and the ancillary element(s) to be generated).

The method 300 may further comprise, at block 308, processing successive layers of build material in the fabrication chamber so as to form successive layers of the object and of the ancillary element. Thus, once the ancillary element has been designed, the additive manufacturing process may commence, so that the target object can be generated along with the ancillary element, thereby to reduce thermal loss from the target object, and enabling a high-quality build to be performed.

Figure 4:
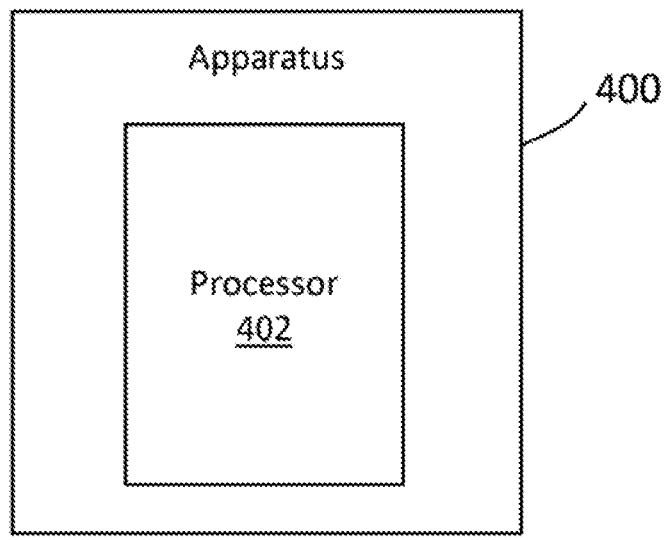
FIG. 4 is a simplified schematic of an example of apparatus for designing a three-dimensional object.

According to a further aspect, an apparatus is disclosed. FIG. 4 is a simplified schematic of an example of an apparatus 400. The apparatus 400 may be to perform the processes described with reference to the blocks of the methods 100, 300 disclosed herein. In some examples, the apparatus 400 may be referred to as an apparatus for designing a three-dimensional object. The apparatus 400 comprises a processor 402. The processor 402 is to receive data representative of a target object to be generated in a fabrication chamber of an additive manufacturing apparatus. The target object data may, for example, be input by a user, or acquired by the processor from a database or other storage facility. The processor 402 is to obtain information relating to dimensions of the fabrication chamber. As above, fabrication chamber information may be input by a user, or acquired by the processor from a database or other storage, facility. In some examples, the data, relating to the chamber may be stored in a memory associated with the additive manufacturing apparatus in which the chamber is installed. For example, the apparatus manufacturer or supplier may provide the dimensions of the chamber and/or the dimensions of the various regions of the print bed (e.g. the high quality region, the low quality region and the non-printable region) to be stored in a memory. The dimensions of the fabrication chamber may be used by the processor 402 to determine when an ancillary element is to be generated. Thus, the processor 402 is to determine, based on the received data and the obtained dimensions, that a portion of the target object is to be generated within a defined threshold distance of part of a wall of the fabrication chamber. In some examples, the processor 402 is to determine, based on the received data and the obtained dimensions, that a portion of the target object is to be generated within a predefined region of the fabrication chamber (e.g. the region adjacent to the inner surface of the walls of the chamber). The processor 402 is also to generate, in response to said determining, data representative of a dummy object to be generated between the part of the target object and the part of the wall of the fabrication chamber. The dummy object may comprise an ancillary element 214 as discussed above.

Figure 5:
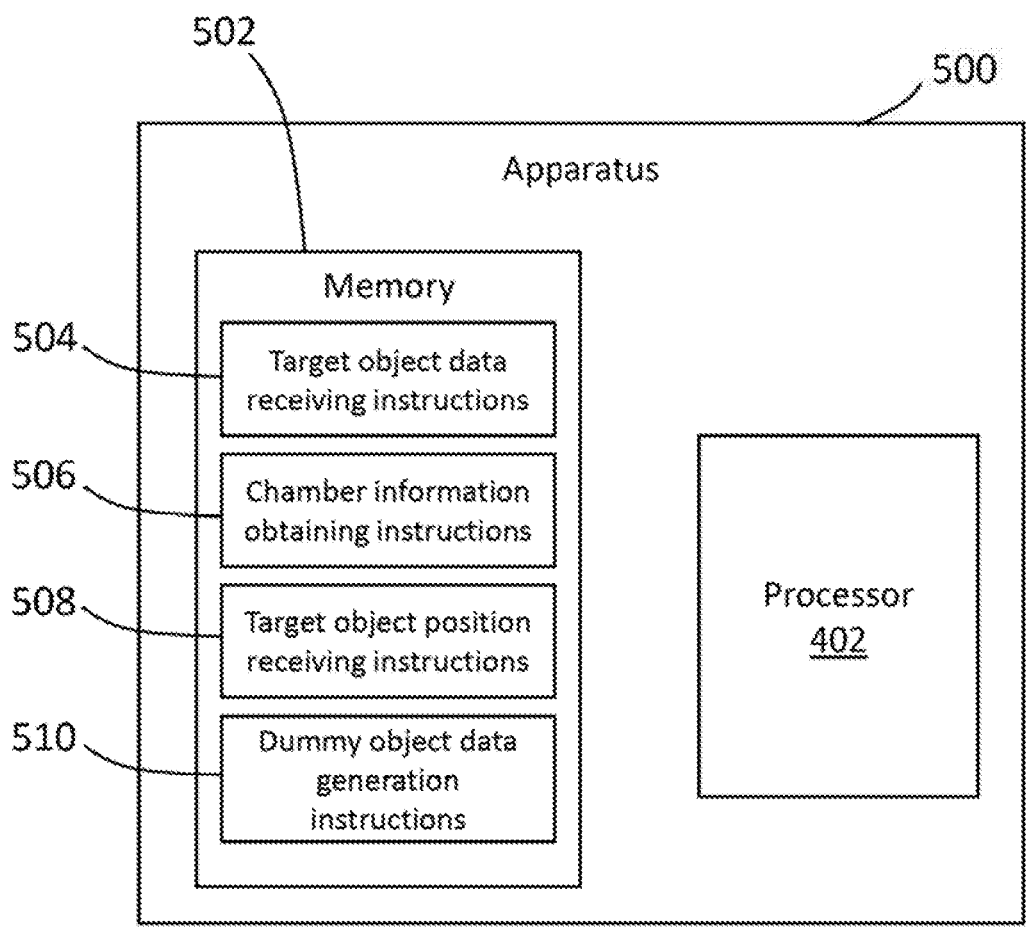
FIG. 5 is a simplified schematic of a further example of apparatus for designing a three-dimensional object.

FIG. 5 is a simplified schematic of a further example of an apparatus 500 (e.g. an apparatus for designing a three-dimensional object). The apparatus 500 may comprise a processor, such as the processor 402 discussed above. In some examples, the apparatus 500 may comprise a memory 502, which is capable of storing data, such as computer-readable instructions. For example, the memory 502 may compose instructions to enable the processor 402 to perform various functions. The memory 502 may, for example, comprise target object data receiving instructions 504 for receiving data representative of a target object to be generated. The memory 502 may, for example, comprise chamber information obtaining instructions 506 for obtaining chamber dimension information. The memory 502 may, for example, comprise target object position receiving instructions 508 for determining that a portion of the target object is to be generated within a defined threshold distance of a wall. The memory 502 may, for example, comprise dummy object data generation instructions 510 for generating the dummy object data.

According to some examples, the apparatus 400, 500 may comprise an additive manufacturing apparatus. The processor 402 may be to operate the additive manufacturing apparatus to generate the target object and the dummy object in the fabrication chamber. In other examples, the apparatus 400, 500 may not comprise an additive manufacturing apparatus. The apparatus 400, 500 may, instead, comprise a computing apparatus. In such examples, the processor 402 may be to deliver the data representative of a target object and the data representative of a dummy object to an additive manufacturing apparatus. Thereafter, the additive manufacturing apparatus may use the delivered data to generate the objects (i.e. the target object and the dummy object).

As described above, the dummy object or ancillary element may be designed based on an estimated heat diffusion profile of the object to be generated. In some examples, the heat diffusion behaviour may be estimated or predicted using a heat diffusion model. Thus, in order to generate data representative of a dummy object, the processor 402 may be to estimate, based on the received data, a heat diffusion pattern associated with the object to be generated. The processor 402 may further be to determine, based on the heat diffusion pattern, a shape of the dummy object. In some examples, the processor 402 may determine a total volume of the dummy object to be generated, based on the design data. For example, in order to compensate for the loss from a relatively larger object to be generated, a dummy object having a relatively larger volume may be designed. In some examples, in order to generate data representative of the dummy object, the processor 402 may further be to determine, based on the determined shape and the estimated heat diffusion pattern, a thickness of the dummy object. The thickness of the dummy object may, in some examples, vary across its width. For example, the dummy object may be thicker in the middle than at its edges.

As noted above, the designing of the dummy object or ancillary element may be performed by a processor in the additive manufacturing apparatus in which the object is to be generated. In this way, the processes of the blocks of the methods 100, 300 may be considered to be automatic, as the appropriate dummy object may be designed for the target object to be generated, without the user providing any further input. In some examples, however, the dummy object may be designed using a processor of the computing device remote from the additive manufacturing apparatus. For example, data representative of the dummy object may be generated using a processor during a design phase, in which a user is designing the object (e.g. the target, object) to be generated, or planning the arrangement of objects to be generated on the print bed. Therefore, the processor 402 may, in some examples, be to present, to a user, a representation of an arrangement of the target object and the dummy object to be generated in the fabrication chamber. The representation may, for example, be presented to the user on a display device associated with the processor 402. In some examples, the representation may be in the form of a plan view, such as the view shown in FIG. 20, or a perspective view, such as the view shown in FIG. 2D. The processor 402 may further be to enable a user to modify the data representative of the target object and the data representative of the dummy object. For example, a user may modify the target object data and/or the dummy object data responsive to the processor presenting the representation. Such a modification may be made by a user to enable more objects to be generated within the fabrication chamber, for example. In this way, a user is able to review the proposed size, shape and/or position of a dummy object, and make changes, for example to enable the user to increase the area utilised on the print bed.

In some examples, an additive manufacturing apparatus may include a removable build unit. The build unit may, for example, include a fabrication chamber and a memory. The memory may store a thermal profile of the fabrication chamber, describing how heat may be diffused throughout the chamber and through walls of the chamber. In this way, the build unit may be, incorporated into different additive manufacturing apparatuses. A processor located in the additive manufacturing apparatus, or in the build unit, may perform processes described in blocks of the methods disclosed herein based on data obtained from the memory of the removable build unit. In this way, an additive manufacturing apparatus may adapt to different build units as they are incorporated into the apparatus.

Figure 6:
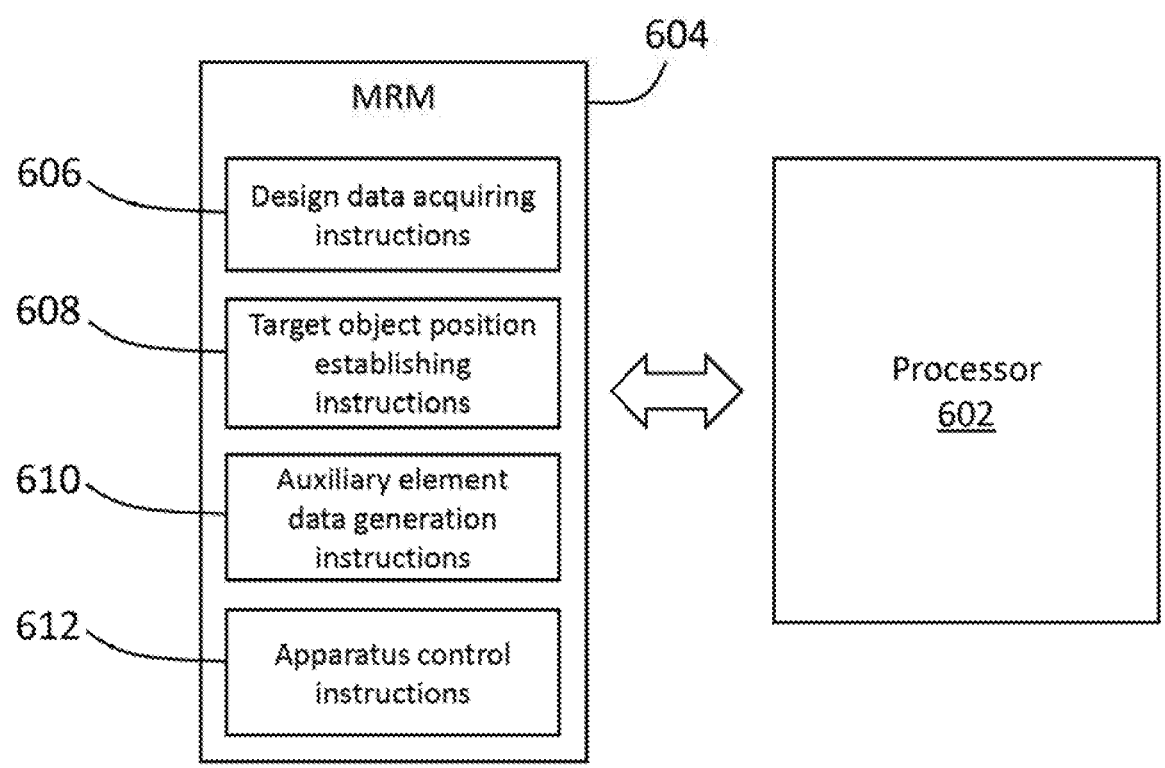
FIG. 6 is a simplified schematic of an example of a machine-readable medium and a processor.

According to a further aspect, a machine-readable medium is disclosed. FIG. 6 is a simplified schematic of an example of a processor 602 and may machine readable medium 604. The machine-readable medium 604 comprises instructions which, when executed by the processor 602, cause the processor to perform functions corresponding to the methods disclosed herein. Instructions (e.g. design data acquiring instructions 606), when executed by the processor 602, cause the processor to acquire design data representing a target object to be generated in a fabrication chamber of an additive manufacturing apparatus. The acquired design data may include spatial location data describing, the intended location of the target object within the fabrication chamber. In some examples, however, the special location data may be acquired separately by the processor 602. Instructions (e.g. target object position establishing instructions 608), when executed by the processor 602, cause the processor to establish, from the design data, that a separation between a part of the target object and part of a wall of the fabrication chamber is less than or equal to a threshold separation. The processor 602 may, in some examples, establish that a part of the target object is to be generated within a predefined region of the fabrication chamber, wherein the predefined region is within a threshold distance of the walls of fabrication chamber. Instructions (e.g. auxiliary element data generation instructions 610), when executed by the processor 602, cause the processor, responsive to said establishing, to generate data representing an auxiliary element to be generated between the part of the target object and the part of the wall of the fabrication chamber. The auxiliary element may, in some examples, be referred to as an auxiliary object, ancillary element or object, or a dummy object. Instructions (e.g. apparatus control instructions 612), when executed by the processor 602, cause the processor to control an additive manufacturing apparatus to generate the target object and the auxiliary element based on the design data and the generated data. Thus, the processor 602 may be associated with the additive manufacturing apparatus. In some examples, the processor 602 may form part of the processing resource of the additive manufacturing apparatus.

In some examples, the machine-readable medium 604 may comprise instructions (e.g. size and shape determining instructions) which, when executed by the processor 602, may cause the processor to determine, based on the design data, a size and shape of the auxiliary element to be generated, such that a thermal profile of the object while the object is being generated is substantially constant. In this way, the auxiliary element help to reduce the amount of the lost from the object through a wall of the fabrication chamber, while the object is generated.

The machine-readable medium 604 may, in some examples, comprise instructions which, when executed by the processor 602, cause the processor to determine the size and shape of the auxiliary element based on a heat diffusion model of the object. Such a heat diffusion model may enable a determination to be made of how heat might be lost from the object, via build material and via walls of the fabrication chamber, such that an appropriate auxiliary element can be designed to reduce the effects of the heat diffusion.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfill the functions of several units recited in the claims.

The features of any dependent claim may be combined with the features of any of the independent claims or other dependent claims.

The invention claimed is:

1. A method comprising:
   obtaining, using a processor, design data representing an object to be generated in a fabrication chamber of an additive manufacturing apparatus;
   determining, based on the design data, that a part of the object is to be generated within a predefined portion of the fabrication chamber, wherein the predefined portion is within a threshold distance of a wall of the fabrication chamber; and
   responsive to said determining, generating, using a processor, data representing an ancillary element to be generated in the predefined portion between the part of the object and the wall of the fabrication chamber.

2. A method according to claim 1, further comprising:
   incorporating the data representing the ancillary element into the design data.

3. A method according to claim 1, wherein generating data representing the ancillary element comprises:
   predicting, based on the design data, heat diffusion from the object; and
   determining a shape of the ancillary element based on the predicted heat diffusion.

4. A method according to claim 3, wherein generating data representing the ancillary element further comprises:
   determining, based on the determined shape and the predicted heat diffusion, a thickness of the ancillary element.

5. A method according to claim 1, wherein determining that a part of the object is to be generated within the predefined portion comprises arranging for at least part of the object to be generated within the predefined portion of the fabrication chamber.

6. A method according to claim 1, further comprising:
   delivering the design data and the data representing an ancillary element to an additive manufacturing apparatus.

7. A method according to claim 1, further comprising:
   processing successive layers of build material in the fabrication chamber so as to form successive layers of the object and of the ancillary element.

8. An apparatus comprising:
   a processor to:
      receive data representative of a target object to be generated in a fabrication chamber of an additive manufacturing apparatus;
      obtain information relating to dimensions of the fabrication chamber;
      determine, based on the received data and the obtained dimensions, that a portion of the target object is to be generated within a defined threshold distance of part of a wall of the fabrication chamber; and
      in response to said determining, generate data representative of a dummy object to be generated between the portion of the target object and the part of the wall of the fabrication chamber.

9. An apparatus according to claim 8, wherein the apparatus comprises an additive manufacturing apparatus; and
   wherein the processor is further to:
      operate the additive manufacturing apparatus to generate the target object and the dummy object in the fabrication chamber.

10. An apparatus according to claim 8, wherein the apparatus comprises a computing apparatus; and
    wherein the processor is further to:
       deliver the data representative of a target object and the data representative of a dummy object to an additive manufacturing apparatus.

11. An apparatus according to claim 8, wherein, in order to generate data representative of a dummy object, the processor is to:

estimate, based on the received data, a heat diffusion pattern associated with the target object; and determine, based on the heat diffusion pattern, a shape of the dummy object.

12. An apparatus according to claim 11, wherein, in order to generate data representative of a dummy object, the processor is further to:

determine, based on the determined shape and the estimated heat diffusion pattern, a thickness of the dummy object.

13. An apparatus according to claim 8, wherein the processor is further to:

present, to a user, a representation of an arrangement of the target object and the dummy object to be generated in the fabrication chamber; and enable a user to modify the data representative of the target object and the data representative of the dummy object.

14. A non-transitory machine-readable medium comprising instructions which, when executed by a processor, cause the processor to:

acquire design data representing a target object to be generated in a fabrication chamber of an additive manufacturing apparatus;

establish, from the design data, that a separation between a part of the target object and part of a wall of the fabrication chamber is less than or equal to a threshold separation;

responsive to said establishing, generate data representing an auxiliary element to be generated between the part of the target object and the part of the wall of the fabrication chamber; and control an additive manufacturing apparatus to generate the target object and the auxiliary element based on the design data and the generated data.

15. A non-transitory machine-readable medium according to claim 14, comprising instructions which, when executed by a processor, cause the processor to:

determine, based on the design data, a size and shape of the auxiliary element to be generated, such that a thermal profile of the object while the object is being generated is substantially constant.

* * * * *